(12) United States Patent
Kato et al.

(10) Patent No.: US 7,744,962 B2
(45) Date of Patent: Jun. 29, 2010

(54) THERMOSETTING LIQUID COATING COMPOSITION FOR ALUMINUM WHEEL AND METHOD OF COATING ALUMINUM WHEEL

(75) Inventors: Atsuya Kato, Hiratsuka (JP); Toshio Ohkoshi, Hiratsuka (JP); Hiroki Takeda, Hiratsuka (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 1081 days.

(21) Appl. No.: 10/552,031

(22) PCT Filed: Apr. 23, 2004

(86) PCT No.: PCT/JP2004/005850

§ 371 (c)(1),
(2), (4) Date: Oct. 3, 2005

(87) PCT Pub. No.: WO2004/094545

PCT Pub. Date: Nov. 4, 2004

(65) Prior Publication Data

US 2006/0276589 A1    Dec. 7, 2006

(30) Foreign Application Priority Data

Apr. 24, 2003  (JP) .............................. 2003-119296

(51) Int. Cl.
  *C08G 73/02*  (2006.01)
(52) U.S. Cl. ..................... 427/407.1; 525/185; 427/409
(58) Field of Classification Search ................ 427/407.1
  See application file for complete search history.

(56) References Cited

U.S. PATENT DOCUMENTS 3,883,453 A * 5/1975 Takahashi et al. ........... 524/733
5,252,399 A * 10/1993 Hirata et al. ................. 428/416
6,022,919 A    2/2000 Komoto et al. .............. 524/430

FOREIGN PATENT DOCUMENTS

| CN | 1152328 A | 6/1997 |
|---|---|---|
| JP | 56-049759 | 5/1981 |
| JP | 56-49759 | 5/1981 |
| JP | 58-113260 | 7/1983 |
| JP | 03-146573 | 6/1991 |
| JP | 3-146573 | 6/1991 |
| JP | 3-278868 | 12/1991 |
| JP | 03-278868 | 12/1991 |
| JP | 04-066172 | 3/1992 |
| JP | 4-66172 | 3/1992 |
| JP | 04066172 * | 3/1992 |
| JP | 6-1949 | 1/1994 |
| JP | 06-212120 | 8/1994 |
| JP | 6-212120 | 8/1994 |
| JP | 7-188603 | 7/1995 |
| JP | 07-188603 | 7/1995 |
| JP | 2001-062391 | 3/2001 |

OTHER PUBLICATIONS

International Search Report dated Aug. 3, 2004.
Chinese Office Action Dated Dec. 22, 2006 and English translation.

* cited by examiner

*Primary Examiner*—Michael Barr
*Assistant Examiner*—Ryan Schiro
(74) *Attorney, Agent, or Firm*—Kratz, Quintos & Hanson, LLP

(57) ABSTRACT

The present invention provides a thermosetting liquid coating composition for an aluminum wheel comprising (A) a hydroxy- and carboxy-containing acrylic resin having a hydroxyl value of 90 to 150 mg KOH/g and an acid value of 1 to 30 mg KOH/g, the acrylic resin being obtained by copolymerizing a monomer mixture comprising 10 to 50 wt. % of a $C_{6-18}$ alkyl ester of (meth)acrylic acid, 8 to 40 wt. % of a secondary hydroxy-containing unsaturated monomer, and a carboxy-containing unsaturated monomer; and (B) an amino resin. Also provided a method of coating an aluminum wheel using the composition.

13 Claims, No Drawings

THERMOSETTING LIQUID COATING COMPOSITION FOR ALUMINUM WHEEL AND METHOD OF COATING ALUMINUM WHEEL

TECHNICAL FIELD

The present invention relates to a thermosetting liquid coating composition for an aluminum wheel and a method of coating an aluminum wheel using the coating composition.

BACKGROUND ART

Steel wheels, aluminum wheels, and the like are used as motor vehicle wheels to which tubes, tires, etc. are to be fitted. In particular, aluminum wheels are widely used because they are excellent in terms of lightness of weight, anticorrosiveness, better design, etc.

Aluminum wheels are usually coated with a primer coating composition, and then with transparent, colored, or lustrous thermosetting topcoat composition(s) one or more times for protection and appearance.

Therefore, primer coating compositions for aluminum wheels need to have excellent adhesion to both the wheel substrate and any topcoat such as a colored topcoat. After a powder primer coating composition is applied, a liquid primer coating composition may additionally be applied to improve the smoothness of the wheel substrate. In this case, the liquid primer coating composition needs to have excellent adhesion to the powder primer coat.

A topcoat formed on the primer coat of an aluminum wheel is required to have excellent appearance in terms of smoothness and luster, and excellent mar resistance so as to prevent scratches caused by skipping stones, etc., when the vehicle is moving. Moreover, if dust or the like adheres to the topcoat in the wheel coating line, it is necessary to repair by grinding down that portion and then reapplying the same coating composition. In this case, excellent adhesion of the reapplied coat, i.e., recoat adhesion is necessary. Furthermore, it is also necessary that coating defects such as sagging and popping be unlikely to occur even if the coat thickness is increased to enhance the aluminum wheel topcoat appearance.

Japanese Unexamined Patent Publication No. 2001-62391 discloses a coating method of forming a primer layer, a lustrous clear coating layer, and a top clear coating layer on an aluminum wheel, wherein the top clear coating layer is formed using a thermosetting acrylic resin coating composition. However, when a known thermosetting acrylic coating composition as used in this method is used, it is difficult to form a top clear coat with excellent appearance, mar resistance and recoat adhesion.

DISCLOSURE OF THE INVENTION

An object of the invention is to provide a thermosetting liquid coating composition for an aluminum wheel which, when used as a primer coating composition for an aluminum wheel, is capable of forming a primer coat with excellent adhesion to any of the wheel substrate, powder primer coat and topcoat.

Another object of the invention is to provide a thermosetting liquid coating composition for an aluminum wheel which, when used as a top clear coating composition for an aluminum wheel, is capable of forming on an aluminum wheel a clear coat with excellent appearance, mar resistance and recoat adhesion, the clear coat being unlikely to have coating defects such as sagging, even if the coat thickness is increased.

A further object of the invention is to provide a method of coating an aluminum wheel using the thermosetting liquid coating composition for an aluminum wheel.

The present inventors carried out extensive research to achieve the above objects, particularly on base resins for thermosetting acrylic resin coating compositions. As a result, the inventors found that when a liquid thermosetting coating composition contains, as a base resin, an acrylic resin obtained by copolymerizing a monomer mixture comprising a specific amount of a long chain alkyl ester of (meth)acrylic acid, a specific amount of a secondary hydroxy-containing unsaturated monomer, and a carboxy-containing unsaturated monomer, the acrylic resin having a hydroxyl value and an acid value within specific ranges, the composition fulfils all the properties required of primer coating compositions and top clear coating compositions for aluminum wheels, and thus the objects can be achieved.

The present invention has been accomplished, based on the above novel finding.

The present invention provides the following thermosetting liquid coating compositions for aluminum wheels and methods of coating aluminum wheels using the compositions.

1. A thermosetting liquid coating composition for an aluminum wheel comprising:
(A) a hydroxy- and carboxy-containing acrylic resin having a hydroxyl value of 90 to 150 mg KOH/g and an acid value of 1 to 30 mg KOH/g, the acrylic resin being obtained by copolymerizing a monomer mixture comprising 10 to 50 wt. % of a $C_{6-18}$ alkyl ester of (meth)acrylic acid, 8 to 40 wt. % of a secondary hydroxy-containing unsaturated monomer, and a carboxy-containing unsaturated monomer; and
(B) an amino resin.

2. The coating composition according to item 1 wherein the proportion of amino resin (B) is 5 to 70 parts by weight per 100 parts by weight of acrylic resin (A) on a solids basis.

3. The coating composition according to item 1 wherein the secondary hydroxy-containing unsaturated monomer is at least one member selected from the group consisting of 2-hydroxypropyl acrylate, 2-hydroxypropyl methacrylate, and unsaturated monomers obtained by esterifying a carboxy-containing unsaturated monomer with an epoxy-containing compound.

4. The coating composition according to item 1 which further comprises an epoxy resin (C).

5. The coating composition according to item 1 which is a primer coating composition for an aluminum wheel.

6. The coating composition according to item 1 which is a top clear coating composition for an aluminum wheel.

7. A method of coating an aluminum wheel comprising:
(1) applying the primer coating composition of item 5 to an aluminum wheel, optionally followed by baking; and
(2) applying a colored thermosetting coating composition to the primer coat obtained in step (1), followed by baking.

8. A method of coating an aluminum wheel comprising:
(1) applying the primer coating composition of item 5 to an aluminum wheel, optionally followed by baking;
(2) applying a colored or lustrous thermosetting coating composition to the primer coat obtained in step (1), optionally followed by baking; and
(3) applying a clear coating composition to the colored or lustrous coat obtained in step (2), followed by baking.

9. A method of coating an aluminum wheel comprising:
(1) applying a liquid primer coating composition to an aluminum wheel, optionally followed by baking;

(2) applying a colored or lustrous thermosetting coating composition to the primer coat obtained in step (1), optionally followed by baking; and
(3) applying the top clear coating composition of item 6 to the colored or lustrous coat obtained in step (2), followed by baking.

10. A method of coating an aluminum wheel comprising:
(1) applying the primer coating composition of item 5 to an aluminum wheel, optionally followed by baking;
(2) applying a colored or lustrous thermosetting coating composition to the primer coat obtained in step (1), optionally followed by baking; and
(3) applying the top clear coating composition of item 6 to the colored or lustrous coat obtained in step (2), followed by baking.

11. A method of coating an aluminum wheel comprising:
(1) applying a powder primer coating composition to an aluminum wheel, followed by baking;
(2) applying the primer coating composition of item 5 to the powder primer coat obtained in step (1), optionally followed by baking;
(3) applying a colored or lustrous thermosetting coating composition to the primer coat obtained in step (2), optionally followed by baking; and
(4) applying a clear coating composition to the colored or lustrous coat obtained in step (3), followed by baking.

12. A method of coating an aluminum wheel comprising:
(1) applying a powder primer coating composition to an aluminum wheel, followed by baking;
(2) applying a liquid primer coating composition to the powder primer coat obtained in step (1), optionally followed by baking;
(3) applying a colored or lustrous thermosetting coating composition to the primer coat obtained in step (2), optionally followed by baking; and
(4) applying the top clear coating composition of item 6 to the colored or lustrous coat obtained in step (3), followed by baking.

13. A method of coating an aluminum wheel comprising:
(1) applying a powder primer coating composition to an aluminum wheel, followed by baking;
(2) applying the primer coating composition of item 5 to the powder primer coat obtained in step (1), optionally followed by baking;
(3) applying a colored or lustrous thermosetting coating composition to the primer coat obtained in step (2), optionally followed by baking; and
(4) applying the top clear coating composition of item 6 to the colored or lustrous coat obtained in step (3), followed by baking.

Thermosetting Liquid Coating Composition for an Aluminum Wheel

The thermosetting liquid coating composition for an aluminum wheel of the invention comprises a specific acrylic resin (A), an amino resin (B), and optionally an epoxy resin (C).

Acrylic Resin (A)

Acrylic resin (A) is a base resin of the coating composition of the invention. The resin is a hydroxy- and carboxy-containing acrylic resin obtained by copolymerizing a monomer mixture comprising a $C_{6-18}$ alkyl ester of (meth)acrylic acid, a secondary hydroxy-containing unsaturated monomer and a carboxy-containing unsaturated monomer, the content of the $C_{6-18}$ alkyl ester of (meth)acrylic acid and that of the secondary hydroxy-containing unsaturated monomer being about 10 to about 50 wt. % of about 8 to about 40 wt. %, respectively.

The content of $C_{6-18}$ alkyl ester of (meth)acrylic acid in the monomer mixture needs to be about 10 to about 50 wt. % to prevent sagging at the time of coating and to provide coat smoothness, etc.

The content of secondary hydroxy-containing unsaturated monomer in the monomer mixture needs to be about 8 to 40 wt. % to provide a coat with excellent adhesion to any of the aluminum wheel substrate, powder primer coat and topcoat and excellent recoat adhesion.

Preferably, the content of $C_{6-18}$ alkyl ester of (meth)acrylic acid in the monomer mixture is about 15 to about 40 wt. %, and that of secondary hydroxy-containing unsaturated monomer is about 10 to about 30 wt. %.

The acrylic resin (A) needs to have a hydroxyl value of about 90 to about 150 mg KOH/g and an acid value of about 1 to about 30 mg KOH/g to provide a good balance between excellent curability of the coating composition and excellent mar resistance and recoat adhesion of the coat. Preferably, the acrylic resin (A) has a hydroxyl value of about 100 to about 140 mg KOH/g and an acid value of about 2 to about 20 mg KOH/g.

Examples of $C_{6-18}$ alkyl esters of (meth)acrylic acid in the monomer mixture include hexyl (meth)acrylate, 2-ethylhexyl (meth)acrylate, n-octyl (meth)acrylate, lauryl (meth)acrylate, stearyl (meth)acrylate, and the like. Such esters can be used singly or as a mixture of two or more.

Examples of secondary hydroxy-containing unsaturated monomers include 2-hydroxypropyl (meth)acrylate, and unsaturated monomers obtained by esterifying carboxy-containing unsaturated monomers with epoxy-containing compounds. Such monomers can be used singly or as a mixture of two or more.

Examples of such epoxy-containing compounds include versatic acid glycidyl esters, tertiary aliphatic acid glycidyl esters, p-tert-butylbenzoic acid glycidyl ester, saturated aliphatic acid glycidyl esters and like glycidyl esters, alkyl glycidyl ethers, phenyl glycidyl ether and like glycidyl ethers.

Examples of such glycidyl esters include those commercially available. Specific examples of commercially available versatic acid glycidyl esters include "Cardura E" (trade name, product of Japan Epoxy Resins Co., Ltd., a $C_{9-11}$ branched higher fatty acid glycidyl ester mixture). Examples of commercially available tertiary fatty acid glycidyl esters include "Equate 9G" (trade name, product of Idemitsu Chemical Co., Ltd.). Examples of commercially available p-tert-butyl benzoic acid glycidyl ester products include "PES-10" (trade name, product of Fuso Chemical Co., Ltd.).

Examples of carboxy-containing unsaturated monomers include acrylic acid, methacrylic acid, itaconic acid, maleic acid and the like. Such monomers can be used singly or as a mixture of two or more.

The monomer mixture may optionally contain other unsaturated monomers in addition to the $C_{6-18}$ alkylester(s) of (meth)acrylic acid, secondary hydroxy-containing unsaturated monomer(s) and carboxy-containing unsaturated monomer(s).

Examples of such other unsaturated monomers include primary hydroxy-containing unsaturated monomers, $C_{1-5}$ alkyl esters of (meth)acrylic acid, $C_{2-18}$ alkoxyalkyl esters of (meth)acrylic acid, vinyl and allyl ethers, aromatic vinyl monomers, alicyclic polymerizable unsaturated monomers, nitrogen-containing unsaturated monomers, phosphate-containing unsaturated monomers and the like.

Examples of primary hydroxy-containing unsaturated monomers include 2-hydroxyethyl (meth)acrylate, 3-hydroxypropyl (meth)acrylate, 4-hydroxybutyl (meth)acrylate and the like.

Examples of $C_{1-5}$ alkyl esters of (meth)acrylic acid include methyl (meth)acrylate, ethyl (meth)acrylate, propyl (meth)acrylate, butyl (meth)acrylate and the like.

Examples of $C_{2-18}$ alkoxyalkyl esters of (meth)acrylic acid include methoxybutyl (meth)acrylate, methoxyethyl (meth)acrylate, ethoxybutyl (meth)acrylate and the like.

Examples of vinyl and allyl ethers include ethyl vinyl ether, n-propyl vinyl ether, isopropyl vinyl ether, butyl vinyl ether, tert-butyl vinyl ether, pentyl vinyl ether, hexyl vinyl ether, octyl vinyl ether, cyclopentyl vinyl ether, cyclohexyl vinyl ether, phenyl vinyl ether, tolyl vinyl ether, benzyl vinyl ether, phenethyl vinyl ether, allyl glycidyl ether, allyl ethyl ether and the like.

Examples of aromatic vinyl monomers include styrene, a-methylstyrene, phenyl (meth)acrylate, phenylethyl (meth)acrylate, phenylpropyl (meth)acrylate, benzyl (meth)acrylate, phenoxyethyl (meth)acrylate and the like.

Examples of alicyclic polymerizable unsaturated monomers include cyclohexyl (meth)acrylate, 4-methanolcyclohexylmethyl (meth)acrylate, isobornyl (meth)acrylate, dicyclopentenyl (meth)acrylate and the like.

Examples of nitrogen-containing unsaturated monomers include N,N-dimethylaminoethyl (meth)acrylate, N,N-diethylaminoethyl (meth)acrylate, N-tert-butylaminoethyl (meth)acrylate, acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, 2-vinylpyridine, 1-vinyl-2-pyrolidone, 4-vinylpyridine, acrylonitrile, methacrylonitrile, allylamine and the like.

Examples of phosphate-containing unsaturated monomers include 2-methacryloyloxyethyl acid phosphate, adducts obtained by equimolar addition of an epoxy-containing unsaturated monomer such as glycidyl (meth)acrylate to orthophosphoric acid or acidic phosphate, and the like.

Acrylic acid resin (A) can be prepared by copolymerizing such a monomer mixture. The copolymerization can be carried out using general techniques for polymerization of vinyl monomers. However, a method of radical polymerization in an organic solvent is the most preferable in terms of suitability for various applications, cost, etc. For example, a desired polymer can be easily obtained by copolymerization in an organic solvent in the presence of a polymerization initiator such as azobisisobutyronitril or benzoylperoxide, typically at a temperature of about 60 to about 170° C.

Acrylic resin (A) preferably has a number average molecular weight of about 1,000 to about 100,000, and more preferably about 3,000 to about 50,000.

Amino Resin (B)

Amino resin (B) in the composition of the invention acts as a crosslinking agent for acrylic resin (A).

Examples of amino resins (B) include methylolated amino resins obtained by reacting an aldehyde with an amino component, and resins obtained by etherifying such a methylolated amino resin with an appropriate alcohol.

Examples of amino components include melamine, urea, benzoguanamine, acetoguanamine, steroguanamine, spiroguanamine, dicyandiamide and the like. Examples of usable aldehydes include formaldehyde, paraformaldehyde, acetaldehyde, benzaldehyde and the like. Examples of alcohols usable for the etherification include methyl alcohol, ethyl alcohol, n-propyl alcohol, i-propyl alcohol, n-butyl alcohol, i-butyl alcohol, 2-ethylbutanol, 2-ethylhexanol and the like.

The proportion of amino resin (B) in the composition of the invention is preferably about 5 to about 70 parts by weight, and more preferably about 10 to about 50 parts by weight, per 100 parts by weight of acrylic resin (A), on a solids basis, to provide a good balance between excellent curability of the coating composition and excellent adhesion of the coat to the top coat, recoat, etc.

Epoxy Resin (C)

The coating composition of the invention may optionally contain an epoxy resin (C) in addition to acrylic resin (A) and amino resin (B). The use of epoxy resin (C) enhances the corrosion resistance of the coat.

Examples of epoxy resins (C) include bisphenol epoxy resins, novolac epoxy resins, modified epoxy resins obtained by modifying bisphenol epoxy resins or novolac epoxy resins. Modified epoxy resins can be prepared by reacting epoxy groups or hydroxy groups in epoxy resins with various modifiers.

Epoxy resin (C) preferably has a number average molecular weight of about 300 to about 6,000, and more preferably about 800 to about 5,500. The resin preferably has an epoxy equivalent of about 150 to about 5,000, and more preferably about 250 to about 4,500.

Examples of bisphenol epoxy resins include resins obtained by increasing the molecular weight by polycondensation of epichlorohydrin and bisphenol, optionally in the presence of a catalyst such as an alkali catalyst; and resins obtained by providing a low molecular weight epoxy resin by condensation of epichlorohydrin and bisphenol, optionally in the presence of a catalyst such as an alkali catalyst, followed by a polyaddition reaction between this low molecular weight epoxy resin and a bisphenol.

Examples of bisphenols include bis(4-hydroxyphenyl)methane [bisphenol F], 1,1-bis(4-hydroxyphenyl)ethane, 2,2-bis(4-hydroxyphenyl)propane [Bisphenol A], 2,2-bis(4-hydroxyphenyl)butane [bisphenol B], bis(4-hydroxyphenyl)-1,1-isobutane, bis(4-hydroxy-tert-butylphenyl)-2,2-propane, p-(4-hydroxyphenyl)phenol, oxybis(4-hydroxyphenyl), sulfonylbis(4-hydroxyphenyl), 4,4'-dihydroxybenzophenone, bis(2-hydroxynaphthyl)methane and the like. Among these, bisphenol A, bisphenol F and the like are preferable. Such bisphenols can be used singly or as a mixture of two or more.

Usable bisphenol epoxy resins include commercially available products. Examples of commercially available products include "EPIKOTE 1001", "EPIKOTE 1004", "EPIKOTE 1007", "EPIKOTE 1009", "EPIKOTE 1010" (products of Japan Epoxy Resins Co., Ltd., trade names), "AER6097", "AER6099" (products of Asahikasei Epoxy Co., Ltd., trade names), "Epomix R-309" (product of Mitsui Petrochemical Industries, Ltd., trade name) and the like.

Examples of novolac epoxy resins include phenol novolac epoxy resins, cresol novolac epoxy resins, phenol glyoxyzal epoxy resins containing many epoxy groups in the molecule and the like.

Examples of usable modified epoxy resins include resins obtained by reacting such a bisphenol epoxy resin or novolac epoxy resin with a fatty acid of a drying oil, epoxyacrylate resins obtained by reacting with a polymerzable unsaturated monomer component containing acrylic acid or methacrylic acid, urethane-modified epoxy resins obtained by reacting with an isocyanate compound; amine-modified epoxy resins obtained by reacting epoxy groups in the above-mentioned bisphenol epoxy resins, novolac epoxy resins or modified epoxy resins with an amine compound to introduce an amino group or quaternary ammonium salt.

Epoxy resin (C), if used, is preferably incorporated into the composition of the invention in a proportion of about 1 to 50 parts by weight, and more preferably about 5 to 35 parts by weight, per 100 parts by weight of acrylic resin (A), on a solids basis, so as to enhance the corrosion resistance of the coat. More preferably, the proportion of epoxy resin (C) is about 5 to about 35 parts by weight per 100 parts by weight of acrylic resin (A).

The coating composition of the invention may optionally contain various additives such as pigments, organic resins, anticissing agents, leveling agents, lubricants, viscosity adjusters, UV absorbers, light stabilizers and the like. Examples of organic resins include urethane resins, polyester resins and the like. Examples of pigments include coloring pigments, lustrous pigments, extender pigments, antirust pigments and the like.

The coating composition of the invention, when used as a primer coating composition for an aluminum wheel, preferably contains pigments such as coloring pigments, extender pigments, antirust pigments and the like. The coating composition of the invention, when used as a top clear coating composition for an aluminum wheel, may contain coloring pigments, lustrous pigments and the like so long as they do not impair the transparency of the obtained coat.

Examples of coloring pigments include white pigments such as titanium dioxide, zinc oxide, white lead, basic lead sulfate, lead sulfate, lithopone, zinc sulfide, antimony white and the like; black pigments such as carbon black, acetylene black, lamp black, bone black, graphite, iron black, aniline black and the like; yellow pigments such as naphthol yellow S, Hansa yellow, pigment yellow L, benzidine yellow, permanent yellow and the like; orange pigments such as chrome orange, chrome vermilion, permanent orange and the like; brown pigments such as iron oxide, umber and the like; red pigments such as red iron oxide, red lead, permanent red, quinacridone red and the like; purple pigments such as cobalt purple, fast violet, methyl violet lake and the like; blue pigments such as Ultramarine Blue, Prussian Blue, cobalt blue, phthalocyanine blue, indigo and the like; green pigments such as chrome green, pigment green B, naphthol green B, phthalocyanine green and the like.

Examples of lustrous pigments include aluminum flake pigments, colored aluminum flake pigments, mica pigments, silver plated glass flakes, alumina flakes, silica flakes, stainless steel flakes, platy iron oxide, glass flakes and the like.

Examples of extender pigments include baryta powder, precipitated barium sulfate, barium carbonate, calcium carbonate, gypsum, clay, silica, white carbon, diatomaceous earth, talc, magnesium carbonate, alumina white, gloss white, mica powder and the like.

Examples of antirust pigments include zinc chromate, strontium chromate, calcium chromate, lead cyanamide, calcium plumbate, zinc phosphate, aluminum phosphate and the like.

The liquid coating composition of the invention may be an organic solvent-based coating composition or an aqueous coating composition. It is usually preferable that the solids content of the coating composition of the invention be about 10 to about 80 wt. %.

Organic solvent-based coating compositions of the invention can be prepared by dissolving or dispersing the above-mentioned components in media such as organic solvents or mixtures of an organic solvent(s) and water by known methods. Examples of usable organic solvents include aromatic solvents, ester solvents, ether solvents, ketone solvents, alcohol solvents, aliphatic hydrocarbon solvents and the like. Such organic solvents may be used singly or in combination of two or more. Organic solvents used at the time of preparing the components may also be usable.

Examples of aromatic solvents include toluene, xylene and the like.

Examples of ester solvents include ethyl acetate, propyl acetate, butyl acetate, methoxybutyl acetate, amyl acetate, methyl cellosolve acetate, cellosolve acetate, diethylene glycol monomethyl ether acetate, carbitol acetate, 3-methoxy butyl acetate, propylene glycol monomethyl ether acetate, dibasic acid esters and the like.

Examples of ether solvents include dioxane, ethylene glycol diethyl ether, ethylene glycol dibutyl ether, ethylene glycol monobutyl ether and the like.

Examples of ketone solvents include acetone, methyl ethyl ketone, methyl isobutyl ketone, cyclohexanone, isophorone and the like.

Examples of alcohol solvents include isopropyl alcohol, n-butyl alcohol, isobutyl alcohol and the like.

Examples of aliphatic hydrocarbon solvents include hexane, heptane, octane and the like.

Aqueous coating compositions of the invention can be prepared by dissolving or dispersing the above-mentioned components in aqueous media such as water or mixtures of water and an organic solvent(s) as mentioned above by known methods. Neutralizers such as ammonia, amine compounds and the like may be used at the time of dissolution or dispersion in the aqueous medium. Examples of usable aqueous media include those used at the time of preparing the components.

The thermosetting liquid coating composition of the invention is advantageously used as a primer coating composition or top clear coating composition for an aluminum wheel.

Method of Coating Aluminum Wheel

The thermosetting coating composition of the invention may be directly applied to an aluminum wheel as a primer coating composition, or applied as a second primer coating composition on a powder primer coat that has been formed by applying and baking a powder primer coating composition.

Alternatively, the thermosetting liquid coating composition of the invention may be applied as a top clear coating composition via a primer coat and a colored coat, or a primer coat and a lustrous coat, formed on an aluminum wheel. The primer coat may be a two-layer film consisting of a powder primer coat, and a second primer coat formed using a liquid primer coating composition.

The coating of the invention can be applied by a known coating process such as airless spray coating, air spray coating, electrostatic coating or the like. It is usually preferable that the cured coat thickness be about 10 to about 60 μm, and more preferably about 15 to about 40 μm. It is usually preferable that baking be carried out by heating at about 100° C. to about 180° C. for about 10 to about 40 minutes, and more preferably at about 110° C. to about 160° C. for about 15 to about 30 minutes.

The following coating methods I to VII for forming a multilayered coating film on an aluminum wheel are preferable as aluminum wheel coating methods using the thermosetting liquid coating composition of the invention.

Coating method I: A method of coating an aluminum wheel comprising:

(1) applying the primer coating composition of the invention to an aluminum wheel, optionally followed by baking; and (2) applying a colored thermosetting coating composition to the primer coat obtained in step (1), followed by baking.

Coating method II: A method of coating an aluminum wheel comprising:

(1) applying the primer coating composition of the invention to an aluminum wheel, optionally followed by baking;

(2) applying a colored or lustrous thermosetting coating composition to the primer coat obtained in step (1), optionally followed by baking; and
(3) applying a clear coating composition to the colored or lustrous coat obtained in step (2), followed by baking.

Coating method III: A method of coating an aluminum wheel comprising:
(1) applying a liquid primer coating composition to an aluminum wheel, optionally followed by baking;
(2) applying a colored or lustrous thermosetting coating composition to the primer coat obtained in step (1), optionally followed by baking; and
(3) applying the top clear coating composition of the invention to the colored or lustrous coat obtained in step (2), followed by baking.

Coating method IV: A method of coating an aluminum wheel comprising:
(1) applying the primer coating composition of the invention to an aluminum wheel, optionally followed by baking;
(2) applying a colored or lustrous thermosetting coating composition to the primer coat obtained in step (1), optionally followed by baking; and
(3) applying the top clear coating composition of the invention to the colored or lustrous coat obtained in step (2), followed by baking.

Coating method V: A method of coating an aluminum wheel comprising:
(1) applying a powder primer coating composition to an aluminum wheel, followed by baking;
(2) applying the primer coating composition of the invention to the powder primer coat obtained in step (1), optionally followed by baking;
(3) applying a colored or lustrous thermosetting coating composition to the primer coat obtained in step (2), optionally followed by baking; and
(4) applying a clear coating composition to the colored or lustrous coat obtained in step (3), followed by baking.

Coating method VI: A method of coating an aluminum wheel comprising:
(1) applying a powder primer coating composition to an aluminum wheel, followed by baking;
(2) applying a liquid primer coating composition to the powder primer coat obtained in step (1), optionally followed by baking;
(3) applying a colored or lustrous thermosetting coating composition to the primer coat obtained in step (2), optionally followed by baking; and
(4) applying the top clear coating composition of the invention to the colored or lustrous coat obtained in step (3), followed by baking.

Coating method VII: A method of coating an aluminum wheel comprising:
(1) applying a powder primer coating composition to an aluminum wheel, followed by baking;
(2) applying the primer coating composition of the invention to the powder primer coat obtained in step (1), followed by baking;
(3) applying a colored or lustrous thermosetting coating composition to the primer coat obtained in step (2), optionally followed by baking; and
(4) applying the top clear coating composition of the invention to the colored or lustrous coat obtained in step (3), followed by baking.

Aluminum Wheels

Substrates to be coated according to the coating method of the invention are aluminum wheels which are to be fitted with tubes, tires, etc. for motor vehicles such as cars, motorcycles, tracks, vans, etc. Aluminum wheels are usually made of alloys containing aluminum as a main component and further containing other materials such as magnesium, silicon and the like.

Examples of usable aluminum wheels include those molded into any suitable shapes for the purposes of lightness of weight, better design, etc. Usable are those that mix different surfaces such as shot blasted rough cast surfaces and smooth cut surfaces.

Before an aluminum wheel is coated by the method of the invention, the wheel surface is preferably subjected to chemical conversion treatment using a chromate finishing agent, a phosphate finishing agent, a zirconium finishing agent, or the like.

2-Coat Coating Processes

Coating method I of the invention may be carried out by a 2-coat 2-bake process comprising applying and baking the primer coating composition of the invention and then applying and baking a colored thermosetting coating composition, or by a 2-coat 1-bake process comprising applying the primer coating composition of the invention and a colored thermosetting coating composition and baking both coating layers at the same time. In 2-coat 1-bake processes, it is usually preferable that the surface coated with the primer coating composition be allowed to stand at room temperature for about 10 seconds to about 10 minutes, and then coated with a colored thermosetting coating composition.

In 2-coat coating processes, the primer coat preferably has a cured film thickness of about 15 to about 35 μm. It is usually preferable that the colored thermosetting coating composition be applied to a cured film thickness of about 10 to about 40 μm by a known coating method such as airless spray coating, air spray coating or electrostatic coating.

In any of the 2-coat 1-bake and 2-coat 2-bake processes, it is usually preferable that both coating layers be baked at about 130° C. to about 160° C. for about 10 to 30 minutes after application of a colored thermosetting coating composition.

Any coating composition known as a topcoat colored composition can be used as the colored thermosetting coating composition. Examples of coating compositions advantageously used are those obtained by dissolving or dispersing in water and/or an organic solvent a hydroxy- or like crosslinkable functional group-containing base resin, such as an acrylic resin, polyester resin, alkyd resin, urethane resin or epoxy resin; a crosslinking agent such as a polyisocyanate compound, blocked polyisocyanate compound, melamine resin or urea resin; and a coloring pigment and the like.

3-Coat Coating Processes

Coating methods II, III and IV of the invention are 3-coat coating processes comprising applying the liquid primer coating composition of the invention or a known liquid primer coating composition, optionally followed by baking; applying a colored or lustrous thermosetting coating composition, optionally followed by baking; and applying the clear coating composition of the invention or a known clear coating composition, followed by baking.

The 3-coat coating processes can be carried out by: a 3-coat 1-bake process comprising applying the coating compositions sequentially and then baking three coating layers at the same time; 3-coat 2-bake process A comprising applying and baking a primer coating composition and then sequentially applying a colored or lustrous thermosetting coating composition and a clear coating composition, followed by baking; 3-coat 2-bake process B comprising sequentially applying a primer coating composition and a colored or lustrous thermosetting coating composition, followed by baking, and then applying and baking a clear coating composition; or a 3-coat 3-bake process comprising applying and baking each coating composition one after the other.

In a 3-coat 1-bake process or a 3-coat 2-bake process, when baking is not carried out after a liquid primer coating composition or a colored or lustrous thermosetting coating composition is applied, it is usually preferable that the coated surface be allowed to stand at room temperature for about 10 seconds to about 10 minutes and then coated with a colored or lustrous thermosetting coating composition or a clear coating composition.

In 3-coat coating processes, the primer coat formed by using the coating composition of the invention preferably has a cured film thickness of about 15 to about 35 μm. When a known liquid primer coating composition is used, it is usually preferable that this composition be applied to a cured film thickness of about 15 to about 35 μm by a known coating method such as airless spray coating, air spray coating or electrostatic coating.

Any known coating composition commonly used as a primer for an aluminum wheel is usable as the known liquid primer coating composition in such 3-coat coating processes. Examples of coating compositions advantageously used are those obtained by dissolving or dispersing in water and/or an organic solvent(s) a hydroxy- or like crosslinkable functional group-containing base resin, such as a polyester resin, alkyd resin, acrylic resin, urethane resin or epoxy resin; a crosslinking agent such as a melamine resin, urea resin, phenol resin or polyisocyanate compound; pigments such as coloring pigments, extender pigments, antirust pigments and the like; and additives such as curing catalysts, leveling agents, antifoaming agents and the like.

It is usually preferable that the colored or lustrous thermosetting coating composition be applied to a cured film thickness of about 10 to about 30 μm by a known coating method such as airless spray coating, air spray coating or electrostatic coating.

Examples of usable colored thermosetting coating compositions include those mentioned in the 2-coat coating processes. Examples of usable lustrous coating compositions include any coating compositions known as topcoat lustrous coating compositions. Examples of coating compositions advantageously used are those obtained by dissolving or dispersing in water and/or an organic solvent(s) a hydroxy- or like crosslinkable functional group-containing base resin such as an acrylic resin, polyester resin, alkyd resin, urethane resin, or epoxy resin; a crosslinking agent such as a polyisocyanate compound, blocked polyisocyanate compound, melamine resin, or urea resin; a lustrous pigment such as an aluminum flake pigment, mica pigment, etc.; and a coloring pigment and the like.

In 3-coat coating processes, the clear coat formed by using the coating composition of the invention preferably has a cured film thickness of about 15 to about 35 μm. When a known clear coating composition is used, it is usually preferable that the composition be applied to a cured film thickness of about 15 to about 35 μm by a known coating method such as airless spray coating, air spray coating or electrostatic coating.

Any known clear coating composition can be used as the known clear coating composition. Examples of clear coating compositions advantageously used are those obtained by dissolving or dispersing in water and/or in an organic solvent(s) a hydroxy- or like crosslinkable functional group-containing base resin such as an acrylic resin, polyester resin, alkyd resin, urethane resin, or epoxy resin; and a crosslinking agent such as a polyisocyanate compound, blocked polyisocyanate compound, melamine resin, or urea resin. The composition may contain coloring pigments, aluminum flake pigments, mica pigments, extender pigments and the like so long as they do not impair the transparency of the obtained coating film.

In coating processes according to a 3-coat 1-bake, 3-coat 2-bake or 3-coat 3-bake coating process, it is usually preferable that baking is carried out at about 130 to about 160° C. for about 10 to about 30 minutes.

Among 3-coat coating processes, a coating process according to 3-coat 2-bake process B or the 3-coat 3-bake process may comprise applying and baking a colored or lustrous thermosetting coating composition and optionally cutting and chemically converting a portion of the aluminum wheel, followed by applying and baking a clear coating composition.

A coating process according to 3-coat 2-bake process A may comprise applying a lustrous thermosetting coating composition to a cured film thickness of about 0.1 to about 2 μm to a cured black or otherwise colored primer coat, allowing the coated surface to stand at room temperature for about 10 second to about 10 minutes and then applying a clear coating composition, followed by baking both coating layers. This can enhance the luster by forming a ultrathin lustrous coating film and thereby controlling the arrangement of scaly lustrous pigment particles such as particles of aluminum flake pigments, mica pigments and the like and is thus preferable.

4-Coat Coating Processes

Coating methods V, VI and VII of the invention are 4-coat coating processes comprising applying a known powder primer coating composition to an aluminum wheel, followed by baking; applying the liquid primer coating composition of the invention or a known liquid primer coating composition, optionally followed by baking; applying a colored or lustrous thermosetting coating composition, optionally followed by baking; and applying the clear coating composition of the invention or a known clear coating composition, followed by baking. The 4-coat coating processes are the same as the 3-coat coating processes except for the addition of a first step in which a powder primer coating composition is applied and baked.

In 4-coat coating processes, as a first step, a known powder primer coating composition is applied to an aluminum wheel, followed by baking. The application of the powder primer coating composition is to improve the smoothness of an aluminum wheel surface that is very rough due to a shot blasting treatment or the like.

It is usually preferable that the powder primer coating composition be applied to a cured film thickness of about 50 to about 150 μm by a known coating method such as electrostatic coating, and baked at about 140° C. to about 180° C. for about 10 to about 40 minutes.

Examples of usable known powder primer coating compositions include any coating compositions commonly used as powder primers for aluminum wheels. Thermosetting epoxy resin powder primer coating compositions are preferable in terms of excellent coat corrosion resistance.

Such thermosetting epoxy resin powder primer coating compositions can be prepared by known methods, for example, by a method comprising dry-blending an epoxy resin such as a bisphenol-epichlorohydrin epoxy resin or a novolac epoxy resin; a crosslinking agent such as a polycarboxyic acid, polycarboxyic acid anhydride or polycarboxyic acid dihydrazide; a pigment such as a coloring pigment, extender pigment, antirust pigment or the like; and additives such as a curing catalyst, leveling agent, antifoaming agent and the like using a mixer, followed by heat melting and kneading, cooling and pulverization, and optionally followed by filtration.

Subsequently, the same steps as in the 3-coat coating processes are followed, that is, the liquid primer coating composition of the invention or a known liquid primer coating composition is applied to the cured powder primer coat, optionally followed by baking; and a colored or lustrous thermosetting coating composition is applied, optionally followed by baking; and the clear coating composition of the invention or a known clear coating composition is applied, followed by baking to finish a 4-coat coating process.

A multilayered coating film consisting of 2, 3 or 4 coats is thus formed on an aluminum wheel by the coating method of the invention.

BEST MODE FOR CARRYING OUT THE INVENTION

Production Examples, Examples and Comparative Examples are given below to describe the present invention in more detail. In these examples, all parts and percentages are expressed on a weight basis.

PRODUCTION EXAMPLES 1 TO 10

Preparation of Acrylic Resin (A)

In each of Production Examples 1 to 10, a 4-necked flask equipped with a stirrer, reflux condenser, nitrogen inlet tube, and dropping funnel was charged with 100 parts of butyl cellosolve and 30 parts of isobutyl alcohol and heated to 115° C. under a stream of nitrogen. A mixture of 100 parts of an unsaturated monomer mixture of one of the compositions shown in Table 1, and 2 parts of azobisisobutyronitril was added thereto at the same temperature over a period of 3 hours, followed by aging at the same temperature for 30 minutes. A mixture of 1 part of azobisisobutyronitril and 20 parts of butyl cellosolve was added thereto over a period of 1 hour, aged for 30 minutes, and then filtered through a 200-mesh nylon cloth to give an acrylic resin solution with a solids content of 40%.

The acrylic resins obtained in Production Examples 1 to 4 and 6 to 10 had a number average molecular weight of 5,000. The acrylic resin obtained in Production Example 5 had a number average molecular weight of 4,500.

Table 1 shows the compositions of the unsaturated monomer mixtures used in Production Examples 1 to 10 (expressed as parts), and the hydroxyl values and acid values of the obtained acrylic resins.

TABLE 1

| | | Production Example | | | | | | | | | |
|---|---|---|---|---|---|---|---|---|---|---|---|
| | | 1 | 2 | 3 | 4 | 5 | 6 | 7 | 8 | 9 | 10 |
| Acrylic resin solution No. | | A-1 | A-2 | A-3 | A-4 | A-5 | A-6 | A-7 | A-8 | A-9 | A-10 |
| Unsaturated monomer mixture | Styrene | 30 | 30 | 30 | 30 | 10 | 30 | 30 | 30 | 30 | 30 |
| | Methyl methacrylate | 10 | 10 | 8 | 10 | | 10 | 10 | | 10 | 7 |
| | n-Butyl acrylate | | | | 22 | | | 8 | | 2 | |
| | Lauryl methacrylate | 15 | 15 | 10 | 8 | | 15 | 15 | 15 | 15 | 15 |
| | 2-Ethylhexyl methacrylate | 15 | 15 | 15 | | 60 | 15 | 15 | 15 | 15 | 15 |
| | 2-Hydroxyethyl methacrylate | 5 | | 5 | 5 | 5 | 22 | | 5 | 5 | 5 |
| | Hydroxypropyl acrylate (*1) | 13 | 14 | 15 | 10 | 10 | 6 | 10 | 13 | 13 | 13 |
| | Hydroxyproyl methacrylate (*2) | 10 | 14 | | 13 | 13 | | 10 | 20 | 10 | 10 |
| | Acrit M201 (*3) | | | 15 | | | | | | | |
| | Acrylic acid | 2 | 2 | 2 | 2 | 2 | 2 | 2 | 2 | | 5 |
| Hydroxyl value (mgKOH/g) | | 117 | 115 | 113 | 117 | 117 | 121 | 82 | 156 | 117 | 117 |
| Acid value (mgKOH/g) | | 16 | 16 | 16 | 16 | 16 | 16 | 16 | 16 | 0 | 39 |

In Table 1, notes (*1) to (*3) refer to the following:
(*1) Hydroxypropyl acrylate: secondary hydroxy groups/primary hydroxy groups = about 75/25 (molar ratio).
(*2) Hydroxypropyl acrylate: secondary hydroxy groups/primary hydroxy groups = about 75/25 (molar ratio).
(*3) "Acrit M201": trade name, product of Daido Chemical Corporation, an unsaturated monomer obtained by esterifying methacrylic acid with "Cardura E" (trade name, product of Japan Epoxy Resins Co., Ltd., a $C_{9-11}$ branched higher fatty acid glycidyl ester mixture).

EXAMPLES 1 TO 3 AND COMPARATIVE EXAMPLES 1 TO 7

Preparation of Clear Coating Compositions

Clear coating compositions were prepared using components in the proportions shown in Table 2. In Table 2, the proportions are expressed on a solids basis (parts).

TABLE 2

| | Example | | | Comparative Example | | | | | | |
|---|---|---|---|---|---|---|---|---|---|---|
| | 1 | 2 | 3 | 1 | 2 | 3 | 4 | 5 | 6 | 7 |
| Acrylic resin solution A-1 | 100 | | | | | | | | | |

TABLE 2-continued

| | Example | | | Comparative Example | | | | | | |
|---|---|---|---|---|---|---|---|---|---|---|
| | 1 | 2 | 3 | 1 | 2 | 3 | 4 | 5 | 6 | 7 |
| Acrylic resin solution A-2 | 100 | | | | | | | | | |
| Acrylic resin solution A-3 | | 100 | | | | | | | | |
| Acrylic resin solution A-4 | | | 100 | | | | | | | |
| Acrylic resin solution A-5 | | | | 100 | | | | | | |
| Acrylic resin solution A-6 | | | | | 100 | | | | | |
| Acrylic resin solution A-7 | | | | | | 100 | | | | |
| Acrylic resin solution A-8 | | | | | | | 100 | | | |
| Acrylic resin solution A-9 | | | | | | | | 100 | | |
| Acrylic resin solution A-10 | | | | | | | | | | 100 |
| Methyl/butyl mixed etherified melamine resin (*4) | 43 | 43 | 43 | 43 | 43 | 43 | 43 | 43 | 43 | 43 |
| Bisphenol A epoxy resin (*5) | 17 | 17 | 17 | 17 | 17 | 17 | 17 | 17 | 17 | 17 |
| Ultraviolet absorber (*6) | 0.7 | 0.7 | 0.7 | 0.7 | 0.7 | 0.7 | 0.7 | 0.7 | 0.7 | 0.7 |

In Table 2, notes (*4) to (*6) refers to the following:
(*4) Methyl/butyl mixed etherified melamine resin: trade name "Cymel 232", product of Mitsui Cytec, Ltd.
(*5) Bisphenol A epoxy resin: trade name "EPIKOTE 1001", product of Japan Epoxy Resins Co., Ltd.; number average molecular weight: about 900, epoxy equivalent: about 490.
(*6) Ultraviolet absorber: trade name "TINUVIN 900", product of Ciba-Geigy Corp.

EXAMPLES 4 TO 6 AND COMPARATIVE EXAMPLES 8 TO 14

Formation of Multilayered Coating Films

A thermosetting epoxy resin organic solvent-based primer coating composition for an aluminum wheel (trade name "#550 Primer", product of Kansai Paint Co., Ltd.) having a viscosity adjusted to about 15 seconds as measured by Ford Cup No. 4 at 20° C. was applied to a cast aluminum plate (AC4C, 10 mm×70 mm×150 mm) chemically converted with chromate (trade name "AL-1000", product of Nihon Parkerizing Co., Ltd.), by air spray coating to a cured film thickness of 40 μm, and allowed to stand 20° C. for 3 minutes.

A thermosetting acrylic resin organic solvent-based lustrous colored base coating composition (trade name "Magicron AL 2500 silver", product of Kansai Paint Co., Ltd.) having a viscosity adjusted to about 10 seconds as measured by Ford cup No. 4 at 20° C. was applied to the uncured primer coat by air spray coating to a cured film thickness of 15 μm, and allowed to stand at 20° C. for 1 minute.

Each of the clear coating compositions of Examples 1 to 3 and Comparative Examples 1 to 7 having a viscosity adjusted to 25 seconds as measured by Ford cup No. 4 at 20° C. was applied to the uncured lustrous colored base coat by air spray coating to a cured film thickness of 40 μm, and allowed to stand at 20° C. for 5 minutes, followed by heating at 140° C. for 20 minutes to bake three coating layers consisting of a primer coat, a lustrous colored base coat and a clear coat at the same time.

A cured multilayered coating film was thus formed by a 3-coat 1-bake process.

Each of the multilayered coating films thus obtained in Examples 4 to 6 and Comparative Examples 8 to 14 was examined for coating performance in terms of appearance, mar resistance and hardness. The test methods are as follows:

Appearance: The multilayered coating film was observed for surface smoothness and luster with the naked eye to evaluate its appearance. In the evaluation, "A" indicates excellent appearance with good smoothness and good luster, while "B" indicates inferior appearance with poor smoothness and/or poor luster.

Mar resistance: A dyeing colour rubbing fastness tester (trade name "FR-II", product of Suga Test Instruments, Co., Ltd.) was used as a mar resistance tester. An abrasive agent was prepared by mixing a polishing powder (trade name "Daruma cleanser", product of Yamasan-shouten Ltd.) and water at a polishing powder/water ratio of 3 g:2 g. About 3 drops of the abrasive agent were placed on a flannel cloth. The flannel was held by the tester terminal and the surface of the multilayered coating film was rubbed against the flannel cloth for 25 reciprocating strokes under a load of 500 g. The film surface was then washed with running water and dried in air. The film was then observed for luster with the naked eye to evaluate its mar resistance according to the following criteria:

A: The film surface showed no change in luster; excellent mar resistance.

B: The film surface showed slight dulling; somewhat poor mar resistance.

C: The film surface showed noticeable dulling; poor mar resistance.

Hardness: The multilayered coating film was subjected to a pencil scratch test according to JIS K-5400 8.4.2 (1990) to determine its hardness.

Performance Test In Terms Of Recoat Adhesion (1) The procedures of Examples 4 to 6 and Comparative Examples 8 to 14 were followed except that each 3-layer coating film was baked at 140° C. for 60 minutes to form a cured multilayered coating film by a 3-coat 1-bake process.

(2) Each of the multilayered coating films thus obtained was coated with the same clear coating composition used in the preparation of the multilayered coating film by air spray coating to a cured film thickness of 40 μm and allowed to stand at 20° C. for 5 minutes, followed by baking at 140° C. for 20 minutes to form a recoat. Using the sample, recoat adhesion was tested by the following method.

Recoat adhesion: Eleven parallel straight cuts were made both lengthwise and crosswise through the recoated surface of the sample at intervals of 1 mm with a knife to reach the substrate, thus giving a grid of one hundred 1 mm×1 mm squares according to JIS K-5400 8.5.2 (1990). An adhesive tape was applied to the surface of the gridded portion and quickly peeled off, and the number of squares on which the recoat remained was counted to evaluate the recoat adhesion according to the following criteria:

A: Excellent adhesion with 100 squares remaining.
B: Somewhat poor adhesion with 80 to 99 squares remaining.
C: Poor adhesion with less than 80 squares remaining.

Coating Defect Preventative Properties in Terms of Sagging and Popping (1) A thermosetting epoxy resin organic solvent-based primer coating composition for an aluminum wheel (trade name "#550 Primer", product of Kansai Paint Co., Ltd.) having a viscosity adjusted to about 15 seconds as measured by Ford Cup No. 4 at 20° C. was applied to a mild steel plate chemically converted by zinc phosphate (0.8 mm×100 mm×450 mm) by air spray coating to a cured film thickness of 40 μm, and allowed to stand 20° C. for 5 minutes.

A thermosetting acrylic resin organic solvent-based lustrous colored base coating composition (trade name "Magicron AL 2500 Silver", product of Kansai Paint Co., Ltd.) having a viscosity adjusted to about 15 seconds as measured by Ford cup No. 4 at 20° C. was applied to the uncured primer coat by air spray coating to a cured film thickness of 15 μm, and allowed to stand at 20° C. for 5 minutes. The primer coat and the lustrous colored base coat were then baked at 140° C. for 20 minutes to provide a coated plate.

(2) Using the coated plate, each of the coating compositions obtained in Examples 1 to 3 and Comparative Examples 1 to 7 was examined for the minimum coating thickness at which coating defects of sagging and popping occurred, in the following manner.

A 10 mm-wide masking tape was applied to one longitudinal end of the coated plate. As soon as the coating composition was applied to the coated plate by air spray coating to a cured film thickness having a lengthwise gradient of 10 μm to 70 μm, the masking tape was peeled off, and the coated plate was tilted at an angle of 60° from the horizontal with the previously masked end being at the bottom and allowed to stand at 20° C. for 5 minutes, followed by baking at 140° C. for 20 minutes to provide a sample used for sagging and popping tests.

The minimum coating thickness of the test sample at which coating defects of sagging and popping occurred was measured to evaluate its coating defect preventative properties according to the following test methods.

Antisagging: The coat of the sample was observed to determine the minimum coat thickness of the topcoat at which sagging occurred at the boundary of the portion from which the tape had been peeled off, and evaluated according to the following criteria:

A: The minimum coat thickness was 45 μm or more; excellent antisagging properties.
B: The minimum coating thickness was 30 μm or more but less than 45 μm; somewhat poor antisagging properties.
C: The minimum coat thickness was less than 30 μm; inferior antisagging properties.

Antipopping: The coat of the sample was observed to determine the minimum coating thickness of the topcoat at which popping occurred, and evaluated according to the following criteria:

A: The minimum film thickness was 45 μm or more; excellent antipopping properties.
B: The minimum film thickness was 30 μm or more but less than 45 μm; somewhat poor antipopping properties.
C: The minimum film thickness was less than 30 μm; inferior antipopping properties.

Table 3 shows the test results of the multilayered coating films of Examples 4 to 6 and Comparative Examples 8 to 14, together with performance test results of the coating compositions of Examples 1 to 3 and Comparative Examples 1 to 7 at the time of forming multilayered coating films.

TABLE 3

|  | Example | | | Comparative Example | | | | | | |
| --- | --- | --- | --- | --- | --- | --- | --- | --- | --- | --- |
|  | 4 | 5 | 6 | 8 | 9 | 10 | 11 | 12 | 13 | 14 |
| Appearance | A | A | A | C | A | A | A | C | A | C |
| Mar resistance | A | A | A | A | A | B | C | A | C | A |
| Hardness | HB | HB | HB | HB | HB | HB | B | H | 2B | H |
| Recoat adhesion | A | A | A | A | A | C | C | A | C | C |
| Antisagging | A | A | A | A | B | C | A | C | A | C |
| Antipopping | A | A | A | A | B | C | A | C | A | C |

EXAMPLES 7 TO 9 AND COMPARATIVE EXAMPLES 15 TO 21

Preparation of Primer Coating Compositions

Primer coating compositions were prepared using components in the proportions shown in Table 4. In Table 4, the proportions are expressed on a solids basis (parts).

TABLE 4

|  | Example | | | Comparative Example | | | | | | |
| --- | --- | --- | --- | --- | --- | --- | --- | --- | --- | --- |
|  | 7 | 8 | 9 | 15 | 16 | 17 | 18 | 19 | 20 | 21 |
| Acrylic resin solution A-1 | 100 | | | | | | | | | |
| Acrylic resin solution A-2 | | 100 | | | | | | | | |
| Acrylic resin solution A-3 | | | 100 | | | | | | | |

TABLE 4-continued

|  | Example | | | Comparative Example | | | | | | |
|---|---|---|---|---|---|---|---|---|---|---|
|  | 7 | 8 | 9 | 15 | 16 | 17 | 18 | 19 | 20 | 21 |
| Acrylic resin solution A-4 |  |  |  | 100 |  |  |  |  |  |  |
| Acrylic resin solution A-5 |  |  |  |  | 100 |  |  |  |  |  |
| Acrylic resin solution A-6 |  |  |  |  |  | 100 |  |  |  |  |
| Acrylic resin solution A-7 |  |  |  |  |  |  | 100 |  |  |  |
| Acrylic resin solution A-8 |  |  |  |  |  |  |  | 100 |  |  |
| Acrylic resin solution A-9 |  |  |  |  |  |  |  |  | 100 |  |
| Acrylic resin solution A-10 |  |  |  |  |  |  |  |  |  | 100 |
| Methyl/butyl mixed etherified melamine resin (*4) | 33 | 33 | 33 | 33 | 33 | 33 | 33 | 33 | 33 | 33 |
| Bisphenol A epoxy resin (*5) | 20 | 20 | 20 | 20 | 20 | 20 | 20 | 20 | 20 | 20 |
| Ultraviolet absorber (*6) | 0.7 | 0.7 | 0.7 | 0.7 | 0.7 | 0.7 | 0.7 | 0.7 | 0.7 | 0.7 |
| Black pigment (*7) | 6.6 | 6.6 | 6.6 | 6.6 | 6.6 | 6.6 | 6.6 | 6.6 | 6.6 | 6.6 |

In Table 4, notes (*4) to (*6) are as defined above.
Note (*7) refers to the following:
(*7) Black pigment: trade name "Carbon MA-100", product of Mitsubishi Chemicals, Inc., dispersed with a portion of the acrylic resin solution using a shaker, followed by mixing.

EXAMPLES 10 TO 12 AND COMPARATIVE EXAMPLES 22 TO 28

Formation of Multilayered Coating Films

Each of the primer coating compositions of Examples 7 to 9 and Comparative Examples 15 to 21, whose viscosity had been adjusted to 15 seconds as measured by Ford Cup No. 4 at 20° C., was applied to a cast aluminum plate (AC4C, 10 mm×70 mm×150 mm) chemically converted with chromate (trade name "AL-1000", product of Nihon Parkerizing Co., Ltd.), by air spray coating to a cured film thickness of 40 μm, and allowed to stand at 20° C. for 3 minutes.

A thermosetting acrylic resin organic solvent-based lustrous colored base coating composition (trade name "Magicron AL 2500 silver", product of Kansai Paint Co., Ltd.) having a viscosity adjusted to 10 seconds as measured by Ford cup No. 4 at 20° C. was applied to the uncured primer coat by air spray coating to a cured film thickness of 15 μm, and allowed to stand at 20° C. for 1 minute.

A thermosetting acrylic resin organic solvent-based clear coating composition (trade name "Magicron ALC-2 Clear", product of Kansai Paint Co., Ltd.) having a viscosity adjusted to 25 seconds as measured by Ford cup No. 4 at 20° C. was applied to the uncured lustrous colored base coat by air spray coating to a cured film thickness of 40 μm, and allowed to stand at 20° C. for 5 minutes, followed by heating at 140° C. for 20 minutes to bake three coating layers consisting of a primer coat, a lustrous colored base coat and a clear coat at the same time.

A cured multilayered coating film was thus obtained by a 3-coat 1-bake process.

Each of the multilayered coating films thus obtained in Examples 10 to 12 and Comparative Examples 22 to 28 was examined for appearance and primer coat adhesion. The test methods are as follows:

Appearance: The multilayered coating film was observed for surface smoothness and luster with the naked eye to evaluate its appearance. In the evaluation, "A" indicates excellent appearance with good smoothness and good luster, while "B" indicates inferior appearance with poor smoothness and/or poor luster.

Primer coat adhesion: The adhesion between the substrate and the primer coat and the adhesion between the primer coat and the base coat were examined in the following manner. Eleven parallel straight cuts were made both lengthwise and crosswise at intervals of 1 mm with a knife to reach the substrate, thus giving a grid of one hundred 1 mm×1 mm squares according to the crosscut tape method of JIS K-5400 8.5.2 (1990). An adhesive tape was applied to the surface of the gridded portion and quickly peeled off, and the number of squares on which the clear coat remained was counted to evaluate the adhesion according to the following criteria:
A: Excellent adhesion with 100 squares remaining.
B: Somewhat poor adhesion with 95 to 99 squares remaining.
C: Poor adhesion with 94 squares or fewer remaining.

Table 5 shows the performance test results obtained using the multilayered coating films of Examples 10 to 12 and Comparative Examples 22 to 28.

TABLE 5

|  | Example | | | Comparative Example | | | | | | |
|---|---|---|---|---|---|---|---|---|---|---|
|  | 10 | 11 | 12 | 22 | 23 | 24 | 25 | 26 | 27 | 28 |
| Appearance | A | A | A | C | A | B | A | A | B | A |
| Primer coat adhesion | A | A | A | A | C | A | C | A | B | B |

EXAMPLE 13 TO 15 AND COMPARATIVE EXAMPLES 29 TO 35

Formation of Multilayered Coating Films

A thermosetting powder primer coating composition (trade name "EVACLAD No. 3600", product of Kansai Paint Co., Ltd., an epoxy resin coating composition using dodecanedioic acid dihydrazide as a curing agent) was applied to a cast aluminum plate (AC4C, 10 mm×70 mm×150 mm) chemically converted with chromate (trade name "AL-1000", product of Nihon Parkerizing Co., Ltd.), by electrostatic powder coating to a cured film thickness of 70 μm, and baked at 160° C. for 15 minutes to cure the powder primer coating.

Each of the primer coating compositions of Examples 7 to 9 and Comparative Examples 15 to 21 having a viscosity adjusted to 15 seconds as measured by Ford Cup No. 4 at 20° C. was applied to the cured powder primer coat by air spray coating to a cured film thickness of 40 μm, and allowed to stand at 20° C. for 3 minutes, followed by baking at 140° C. for 20 minutes to cure the second primer coat.

A thermosetting acrylic resin organic solvent-based lustrous colored base coating composition (trade name "Magicron AL 2500 silver", product of Kansai Paint Co., Ltd.) having a viscosity adjusted to 8 seconds as measured by Ford cup #4 at 20° C. was applied to the cured second primer coat by air spray coating to a cured film thickness of 1 μm, and allowed to stand at 20° C. for 1 minute.

A thermosetting acrylic resin organic solvent-based clear coating composition (trade name "Magicron ALC-2 Clear", product of Kansai Paint Co., Ltd.) having a viscosity adjusted to 25 seconds as measured by Ford cup No. 4 at 20° C. was applied to the uncured lustrous colored base coat by air spray coating to a cured film thickness of 40 μm, and allowed to stand at 20° C. for 5 minutes, followed by heating at 140° C. for 20 minutes to bake two coating layers consisting of a lustrous colored base coat and a clear coat at the same time.

A cured multilayered coating film was thus obtained by a 4-coat 3-bake process.

The multilayered coating films thus obtained in Examples 13 to 15 and Comparative Examples 29 to 35 were examined for appearance and second primer coat adhesion. The test methods are as follows:

Appearance: The multilayered coating film was observed for surface smoothness and luster with the naked eye to evaluate its appearance. In the evaluation, "A" indicates excellent appearance with good smoothness and good gloss, while "B" indicates inferior appearance with poor smoothness and/or poor luster.

Second primer coat adhesion: The adhesion between the powder primer coat and second primer coat and the adhesion between the second primer coat and the base coat were examined in the following manner. Eleven parallel straight cuts were made both lengthwise and crosswise at intervals of 1 mm with a knife to reach the substrate, thus giving a grid of one hundred 1 mm×1 mm squares according to the crosscut tape method of JIS K-5400 8.5.2 (1990). An adhesive tape was applied to the surface of the gridded portion and quickly peeled off, and the number of squares on which the clear coat remained was counted to evaluate the adhesion according to the following criteria:
A: Excellent adhesion with 100 squares remaining.
B: Somewhat poor adhesion with 95 to 99 squares remaining.
C: Poor adhesion with 94 or less squares remaining.

Coating Defect Preventative Properties in Terms of Sagging and Popping (1) A thermosetting powder primer coating composition (trade name "Everclad No. 3600", product of Kansai Paint Co., Ltd., an epoxy resin coating composition using dodecanedioic acid dihydrazide as a curing agent) was applied to mild steel plates chemically converted by zinc phosphate (0.8 mm×100 mm×450 mm) by electrostatic powder coating to a cured film thickness of 70 μm, followed by baking the powder primer coat at 160° C. for 15 minutes to provide a coated plate.

(2) Using the coated plate, each of the coating compositions obtained in Examples 7 to 9 and Comparative Examples 15 to 21 was examined for the minimum coating thickness at which coating defects of sagging and popping occurred, in the following manner.

A 10 mm-wide masking tape was applied to one longitudinal end of the coated plate. As soon as the coating composition was applied to the coated plate by air spray coating to a cured film thickness having a lengthwise gradient of 10 μm to 70 μm, the masking tape was peeled off, and the coated plate was tilted at an angle of 60° from the horizontal with the previously masked end being at the bottom and allowed to stand at 20° C. for 5 minutes, followed by baking at 140° C. for 20 minutes to provide a sample used for sagging and popping tests.

The minimum coating thickness of the test sample at which coating defects of sagging and popping occurred was measured to evaluate its coating defect preventative properties according to the following test methods.

Antisagging: The coat of the sample was observed to determine the minimum coat thickness of the topcoat at which sagging occurred at the boundary of the portion from which the tape had been peeled off, and evaluated according to the following criteria:
A: The minimum coat thickness was 45 μm or more; excellent antisagging properties.
B: The minimum coating thickness was 30 μm or more but less than 45 μm; somewhat poor antisagging properties.
C: The minimum coat thickness was less than 30 μm; inferior antisagging properties.

Antipopping: The coat of the sample was observed to determine the minimum coating thickness of the topcoat at which popping occurred, and evaluated according to the following criteria:
A: The minimum film thickness was 45 μm or more; excellent antipopping properties.
B: The minimum film thickness was 30 μm or more but less than 45 μm; somewhat poor antipopping properties.
C: The minimum film thickness was less than 30 μm; inferior antipopping properties.

Table 6 shows the test results of the multilayered coating films of Examples 13 to 15 and Comparative Examples 29 to 35, together with performance test results of the coating compositions of Examples 7 to 9 and Comparative Examples 15 to 21 at the time of forming multilayered coating films.

TABLE 6

|  | Example | | | Comparative Example | | | | | | |
| --- | --- | --- | --- | --- | --- | --- | --- | --- | --- | --- |
|  | 13 | 14 | 15 | 29 | 30 | 31 | 32 | 33 | 34 | 35 |
| Appearance | A | A | A | C | A | B | A | A | B | A |
| Second primer adhesion | A | A | A | A | C | A | C | A | B | B |
| Antisagging | A | A | A | A | A | A | C | B | A | A |
| Antipopping | A | A | A | A | A | C | C | B | A | A |

EFFECTS OF THE INVENTION

The thermosetting liquid coating composition for an aluminum wheel of the invention has the following remarkable effects.

(1) The coating composition of the invention, when used as a primer coating composition for an aluminum wheel, can form a primer coat with excellent adhesion to any of the wheel substrate, powder primer coat and topcoat.

(2) The coating composition of the invention, when used as a top clear coating composition for an aluminum wheel, can form a clear coat with excellent appearance, mar resistance and recoat adhesion.

(3) When the coating composition of the invention is used, coating defects such as sagging and popping are unlikely to occur, even if the coating thickness is increased. Therefore, the composition, particularly when used as a top clear coating composition for an aluminum wheel, can further improve appearance properties such as smoothness and luster by increasing the coat thickness.

The invention claimed is:

1. A thermosetting liquid coating composition for an aluminum wheel comprising:
   (A) a hydroxy- and carboxy-containing acrylic resin having a hydroxyl value of 90 to 150 mg KOH/g and an acid value of 1 to 30 mg KOH/g, the acrylic resin being obtained by copolymerizing a monomer mixture comprising 10 to 50 wt. % of a $C_{6-18}$ alkyl ester of(meth)acrylic acid, 8 to 40 wt. % of a secondary hydroxy-containing unsaturated monomer, and a carboxy-containing unsaturated monomer; and
   (B) an amino resin.

2. The coating composition according to claim 1 wherein the proportion of amino resin (B) is 5 to 70 parts by weight per 100 parts by weight of acrylic resin (A) on a solids basis.

3. The coating composition according to claim 1 wherein the secondary hydroxy-containing unsaturated monomer is at least one member selected from the group consisting of 2-hydroxypropyl acrylate, 2-hydroxypropyl methacrylate, and unsaturated monomers obtained by esterifying a carboxy-containing unsaturated monomer with an epoxy-containing compound.

4. The coating composition according to claim 1 which further comprises an epoxy resin (C).

5. The coating composition according to claim 1 which is a primer coating composition for an aluminum wheel.

6. The coating composition according to claim 1 which is a top clear coating composition for an aluminum wheel.

7. A method of coating an aluminum wheel comprising:
   (1) applying the primer coating composition of claim 5 to an aluminum wheel, optionally followed by baking; and
   (2) applying a colored thermosetting coating composition to the primer coat obtained in step (1), followed by baking.

8. A method of coating an aluminum wheel comprising:
   (1) applying the primer coating composition of claim 5 to an aluminum wheel, optionally followed by baking;
   (2) applying a colored or lustrous thermosetting coating composition to the primer coat obtained in step (1), optionally followed by baking; and
   (3) applying a clear coating composition to the colored or lustrous coat obtained in step (2), followed by baking.

9. A method of coating an aluminum wheel comprising:
   (1) applying a liquid primer coating composition to an aluminum wheel, optionally followed by baking;
   (2) applying a colored or lustrous thermosetting coating composition to the primer coat obtained in step (1), optionally followed by baking; and
   (3) applying the top clear coating composition of claim 6 to the colored or lustrous coat obtained in step (2), followed by baking.

10. A method of coating an aluminum wheel comprising:
    (1) applying the coating composition of claim 1 to an aluminum wheel, optionally followed by baking;
    (2) applying a colored or lustrous thermosetting coating composition to the primer coat obtained in step (1), optionally followed by baking; and
    (3) applying the coating composition of claim 1 to the colored or lustrous coat obtained in step (2), followed by baking.

11. A method of coating an aluminum wheel comprising:
    (1) applying a powder primer coating composition to an aluminum wheel, followed by baking;
    (2) applying the primer coating composition of claim 5 to the powder primer coat obtained in step (1), optionally followed by baking;
    (3) applying a colored or lustrous thermosetting coating composition to the primer coat obtained in step (2), optionally followed by baking; and
    (4) applying a clear coating composition to the colored or lustrous coat obtained in step (3), followed by baking.

12. A method of coating an aluminum wheel comprising:
    (1) applying a powder primer coating composition to an aluminum wheel, followed by baking;
    (2) applying a liquid primer coating composition to the powder primer coat obtained in step (1), optionally followed by baking;
    (3) applying a colored or lustrous thermosetting coating composition to the primer coat obtained in step (2), optionally followed by baking; and
    (4) applying the top clear coating composition of claim 6 to the colored or lustrous coat obtained in step (3), followed by baking.

13. A method of coating an aluminum wheel comprising:
    (1) applying a powder primer coating composition to an aluminum wheel, followed by baking;
    (2) applying the coating composition of claim 1 to the powder primer coat obtained in step (1), optionally followed by baking;
    (3) applying a colored or lustrous thermosetting coating composition to the primer coat obtained in step (2), optionally followed by baking; and
    (4) applying the coating composition of claim 1 to the colored or lustrous coat obtained in step (3), followed by baking.

* * * * *